April 24, 1951 T. J. VIDRICK ET AL 2,550,504
HEATED WINDSHIELD WIPER BLADE CONSTRUCTION
Filed Aug. 6, 1949 2 Sheets-Sheet 2
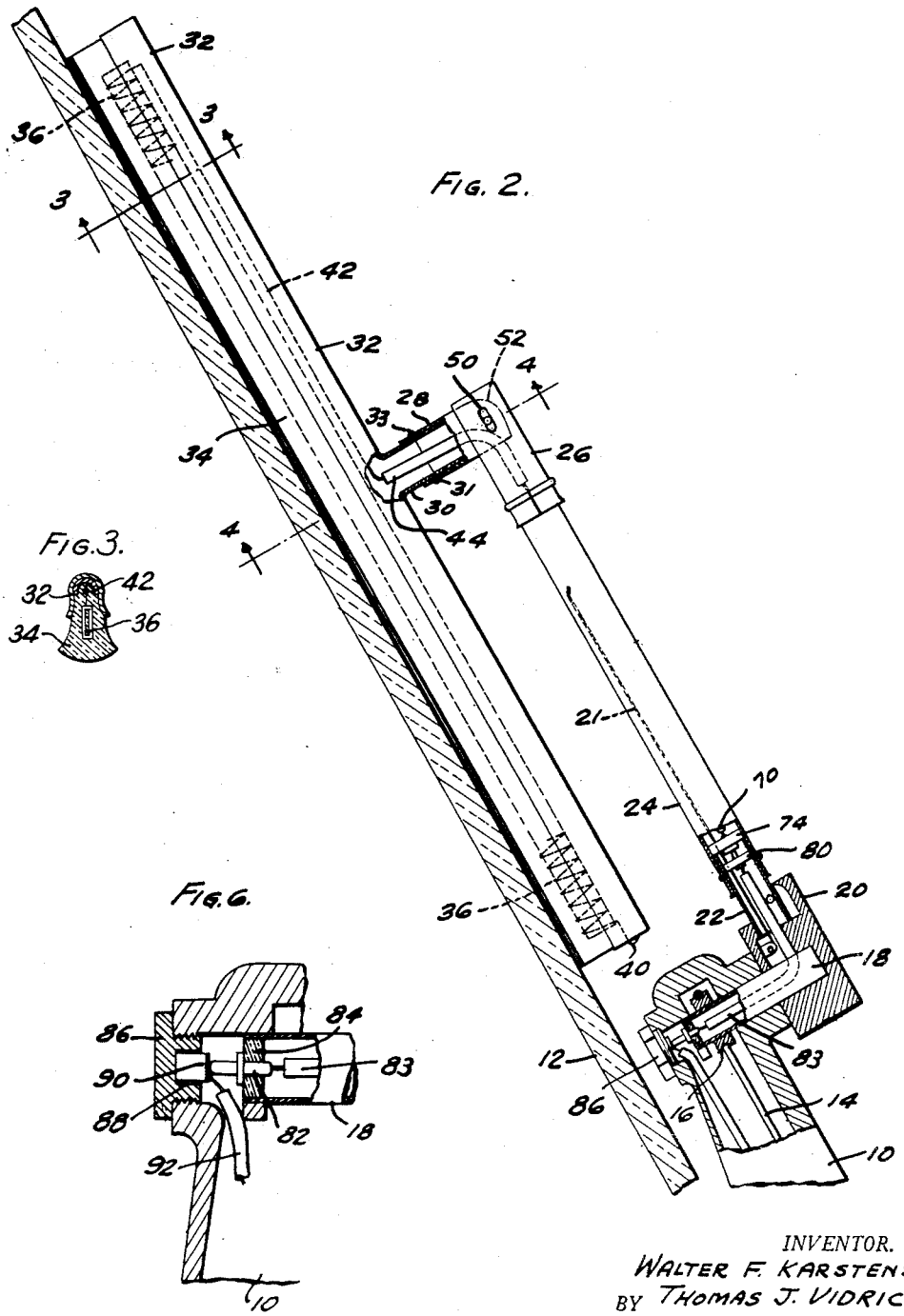
INVENTOR.
WALTER F. KARSTENS
BY THOMAS J. VIDRICK
Harry H. Hitzeman
ATTORNEY.

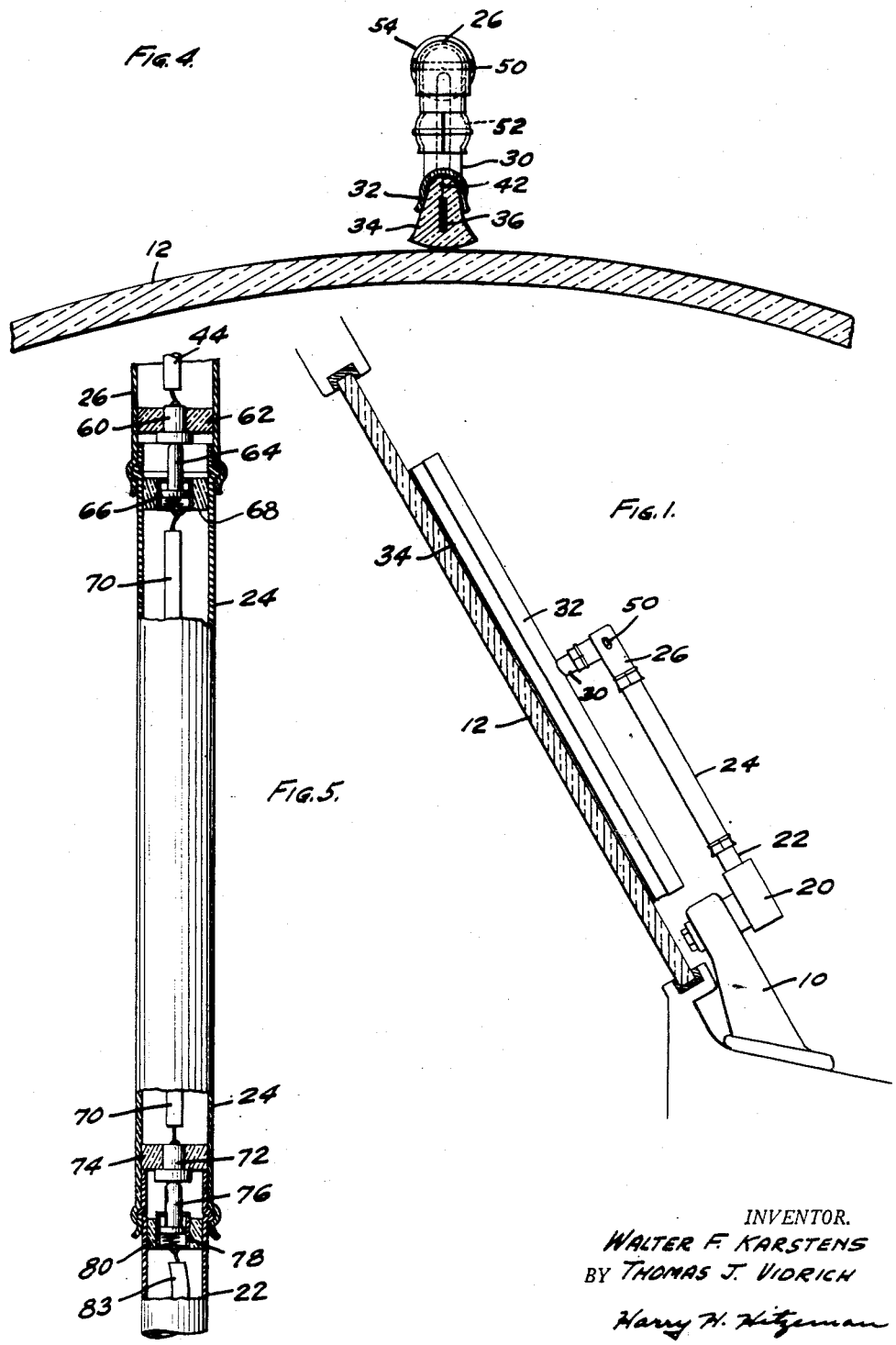

Patented Apr. 24, 1951

2,550,504

UNITED STATES PATENT OFFICE 2,550,504

HEATED WINDSHIELD WIPER BLADE CONSTRUCTION

Thomas J. Vidrick and Walter F. Karstens, Arlington Heights, Ill.

Application August 6, 1949, Serial No. 109,116

7 Claims. (Cl. 219—19)

Our invention relates to improvements in windshield wiper construction.

Our invention relates more particularly to a construction for heating the wiper blade to prevent an accumulation of sleet or ice on the wiper blade itself.

In modern airplane, train, automobile or other vehicle construction provision is made for defrosting the windshield, means usually employing heated air blown against one surface of the same of sufficient intensity to penetrate through the glass or other transparent material employed for the windshield.

Prior to the commercial use of the above construction, attempts were made to remove ice, sleet, and snow on the exposed surface of the windshield by presenting a heated casing located between a pair of rubber squeegee blades. Such constructions are shown and described in United States Patent Numbers 1,980,254, 1,719,006, 1,750,524, and others. These constructions were not commercially practical for the purpose of cleaning snow, sleet, and ice from the windshield, and, as a result, the present defrosting method, including heating the surface of the windshield from the inside, is now universally used. However, a problem still remains. While heating the surface of the windshield operates very successfully to clear snow, sleet, and ice from the windshield, one difficulty remains. The windshield wiper or wipers which operate on the outside of the windshield glass have a tendency during freezing weather to accumulate snow and ice until the entire blade is covered with a frozen coating which slides over the surface of the glass without effecting any cleaning or wiping action. This requires the necessity of manually cleaning the same from time to time, especially in the case of streetcars, buses, trucks, and other vehicles which are required to operate in any and all adverse weather conditions.

The principal object of our invention is to provide means for heating the windshield wiper blades to prevent accumulation or ice or sleet on the same.

A further object of our invention is to provide a construction adaptable to standardization for the different makes of streetcars, buses, automobiles, and other vehicles.

A further object of the invention is to provide an improved construction of heated windshield wiper and circuit therefor which is comparatively simple in construction and operation so arranged that it will withstand long and hard usage without becoming broken or out of order.

For a more comprehensive understanding of our invention and its attendant advantages, reference is had to the accompanying drawings upon which Fig. 1 is a side elevational view showing the general installation of the new type of windshield wiper, the windshield being shown in cross-section.

Fig. 2 is an enlarged view similar to Fig. 1 with parts being broken into section to more clearly show other parts.

Fig. 3 is an enlarged cross-sectional view through the wiper blade taken generally on the line 3—3 of Fig. 2.

Fig. 4 is a similar cross-sectional view taken through the operating arm and associated parts on the line 4—4 of Fig. 2.

Fig. 5 is an enlarged fragmentary sectional view showing the connections in the removable arm.

Fig. 6 is an enlarged fragmentary sectional view showing the electrical current in the windshield wiper post.

In the embodiment of the invention which we have chosen to illustrate and describe the same, we have shown an installation of the windshield of an automotive vehicle, it being understood that similar installations can be made on airplanes, streetcars, trucks, motor boats, and other types of vehicles or boats which are provided with a windshield to protect the driver.

The windshield wiper may include a post 10 which is normally positioned on an automobile on the hood or frame in front of the windshield 12. The windshield assembly may be driven in a number of different ways from either an air motor or other source of power and may include a belt drive 14 to a pulley 16 secured to a hollow shaft 18 mounted in the upper end of the windshield wiper post. The shaft 18 may have a bracket 20 secured to the end of the same, the bracket being provided with a pivoted tubular member 22 extending upwardly therefrom and telescopically received in the tubular arm 24. The arm 24 may connect at its upper end to a bracket 26 from which a neck portion 28 extends forward to receive an extension 30 of the windshield wiper blade bracket 32.

The bracket 32 may be U-shaped and receive the rubber wiper blade 34 clamping it therein about its upper edge. The wiper blade is adapted to be centrally split to receive a winding or Nichrome wire 36, one end of which extends to and is grounded at 40 on the bracket 32 and the other end 42 extending downwardly to attachment with a plastic covered lead-in conduit wire 44.

The neck 28 and extension 30 of the wiper bracket have a snap connection, the end of the neck 28 being flared to telescopically receive the extension 30, it being provided with a circular ridge 31 to snap into place in a circular groove 33.

The neck 28 is mounted for limited vertical rotary movement in the bracket 26 upon a pair of pins 50 and is provided with a partial spherical shape 52 to permit limited sideways angular movement, chiefly to compensate for use on arcuately shaped or curved windshields.

The bracket 26 is adapted to telescopically receive the upper end of the tubular arm 24, being formed with a ridge 54 and slots to snap over the end of the arm 24 and frictionally hold the same in place similar to the connection between the bracket 26 and the extension 30.

The lower end of arm 24 is also adapted to telescopically receive the end of the tubular member 22 and snap into position holding the same in a firm connection.

The conduit 44 which connects with the heating coil 36 in the windshield wiper blade may have one end secured to a contact member 60 fixedly mounted in a insulated member 62 in the end of the bracket 26. The contact member 60 makes contact with a spring pressed pin member 64 mounted in a shell 66 held in position in the end of arm 24 by an insulating washer 68. A conduit 70 extends therefrom to a similar contact member 72 mounted in an insulating washer 74 adjacent to the lower end of the arm 24. A spring pressed contact pin 76 bears against the contact member 72, the pin 76 being mounted in a shell 78 in an insulating washer 80 fixedly held in the end of the tubular member 22.

A conduit 80 may be connected to the shell 78 and extends from the same through the hollow shaft 18 and connects with a contact pin 82 fixedly mounted in an insulating washer 84 adjacent the end of the hollow shaft 18. A nut member 86 is adapted to be screw-threadedly mounted in post 10 at the end of hollow shaft 18, the nut member being provided with a cavity 88 in which a spring contact finger 90 is mounted. The contact finger bears against the pin 82 and makes contact with the conduit 92 which extends down through the post to the battery or other source of electrical energy.

With the construction which we have provided, it can be seen that when the wiper is operating, current will flow through the circuit above described and energize the resistance coil 36 so that the end of the wiper blade 34 is heated sufficiently to cause ice, sleet or other precipitation on the same to melt and run off. In this way, with the windshield being heated from the interior of the vehicle to permit the removal of snow or sleet by the wiper, the blade which is also free of any icy coating is able to efficiently sweep the surface of the windshield clean.

In the installation of the improved windshield wiper on some vehicles, it is preferable to provide means for yieldingly urging the blade against the windshield. Accordingly, we have provided the spring blade 21 in the arm 24 which presses the assembly against the windshield, the spring being pivoted in the housing 20 and extending through suitable slots provided in the insulating washers 74 and 80.

From the above and foregoing description, it will be apparent to those skilled in the art that we have provided a construction for a heated windshield wiper blade including a circuit whereby the same may be assembled or disassembled to remove or replace parts without being required to rewire the mechanism in any way. The arm 24 with its spring pressed contact points permits the removal of the blade for replacement or repair and assembly and this is easily accomplished by snapping the arm into the wiper blade bracket.

While we have illustrated and described a specific embodiment of the invention, it will be apparent to those skilled in the art that changes and modifications may be made in the exact details shown and we do not wish to be limited in any particular, rather what we desire to secure and protect by Letters Patent of the United States is:

1. A windshield wiper having a mounting post, a hollow shaft mounted therein, means for reciprocally rotating the same, an arm mounted on said shaft, a pivoted bracket at the end of said arm, a windshield wiper bracket secured to said bracket, a rubber wiper blade carried by said bracket, a resistance wire embedded in said blade, one end of the same grounded to said bracket and the other end connected by a conduit to a source of energy, said conduit extending through said arm, said hollow shaft and said mounting post, said conduit including a pin member in said hollow shaft normally rotatable against a spring blade member during operation.

2. In windshield wiper construction, a rubber wiper blade having a resistance wire embedded therein, a frame for said blade, a mounting for said frame, an arm telescopically mounted in said mounting, a rigid post, a hollow shaft therein, a collar on the end of said post, a tubular extension thereon, said post telescopically mounted over said tubular extension and a conduit from said resistance wire through the blade, frame, arm, and hollow shaft arranged to avoid twisting of said conduit during operation of said windshield wiper, said construction including a fixed wire in said arm and spring pressed contact members at both ends of said wire.

3. In windshield wiper construction, a rubber wiper blade having a resistance wire embedded therein, a frame for said blade, a mounting for said frame, an arm telescopically mounted in said mounting, a rigid post, a hollow shaft therein, a collar on the end of said post, a tubular extension thereon, said post telescopically mounted over said tubular extension and a conduit from said resistance wire through the blade, frame, arm, and hollow shaft arranged to avoid twisting of said conduit during operation of said windshield wiper, said conduit including a fixed wire in said arm and spring pressed contact members at both ends of said wire, and a fixed contact member in said hollow shaft and a spring contact member in said post.

4. The combination with a windshield wiper having a mounting post, a hollow shaft mounted therein, a tubular arm connected thereto, a pivoted hollow bracket at the end of said arm, a windshield wiper support bracket secured to said pivoted bracket, a rubber wiper blade carried by said wiper bracket, a resistance wire embedded in said blade, one end of the same grounded to said windshield wiper bracket, and an electrical connection to the other end of said wire through said tubular arm and mounting post, said connection including spring pressed contact members at both ends of said tubular arm.

5. The combination with a windshield wiper having a mounting post, a hollow shaft mounted therein, a tubular arm connected thereto, a pivoted hollow bracket at the end of said arm, a windshield wiper support bracket secured to said pivoted bracket, a rubber wiper blade carried by said wiper bracket, a resistance wire embedded in said blade, one end of the same grounded to said windshield wiper bracket, an electrical connection to the other end of said wire through said tubular arm and mounting post, said connection including spring pressed contact members at both ends of said tubular arm, and a spring pressed pivotally rotatable contact member in said mounting post.

6. The combination with a windshield wiper having a mounting post, a hollow shaft mounted therein, a tubular arm connected thereto, a pivoted hollow bracket at the end of said arm, a windshield wiper support bracket secured to said pivoted bracket, a rubber wiper blade carried by said wiper bracket, a resistance wire embedded in said blade, one end of the same grounded to said windshield wiper bracket, an electrical connection to the other end of said wire through said tubular arm and mounting post, said connection including spring pressed contact members at both ends of said tubular arm, and a spring pressed pivotally rotatable contact member in said mounting post, said tubular arm having a snap-spring connection with said shaft and said first named bracket.

7. A windshield wiper having a mounting post, a hollow arm, a pivoted hollow bracket at the end of said arm, a windshield wiper support bracket secured to said pivoted bracket, a rubber wiper blade carried by said windshield wiper bracket, a resistance wire embedded in said blade, one end of the same grounded to said windshield wiper support bracket and the other end connected by an electrical conduit to a source of electrical energy, said conduit extending downwardly from said wiper through said hollow bracket, hollow arm and said mounting post and including in said hollow arm an electric conduit having a spring pressed contact member at one end and a fixed contact member at the other.

THOMAS J. VIDRICK.
WALTER F. KARSTENS.

REFERENCES CITED

The following references are of record in the file of this patent:

UNITED STATES PATENTS

| Number    | Name     | Date           |
|-----------|----------|----------------|
| 1,284,792 | Schwartz | Nov. 12, 1918  |
| 1,643,067 | Goodman  | Sept. 20, 1927 |
| 1,719,006 | Fogland  | July 2, 1929   |
| 2,194,671 | Pauro    | Mar. 26, 1940  |